United States Patent
Afonso (10) Patent No.: US 11,612,271 B2
(45) Date of Patent: Mar. 28, 2023

(54) MULTIFUNCTION ASSEMBLABLE BARBECUE GRILL

(71) Applicant: Walter Aldo Afonso, Miami, FL (US)

(72) Inventor: Walter Aldo Afonso, Miami, FL (US)

( * ) Notice: Subject to any disclaimer, the term of this patent is extended or adjusted under 35 U.S.C. 154(b) by 243 days.

(21) Appl. No.: 17/166,798

(22) Filed: Feb. 3, 2021

(65) Prior Publication Data

US 2022/0240720 A1 Aug. 4, 2022

(51) Int. Cl.
*A47J 37/07* (2006.01)

(52) U.S. Cl.
CPC .... *A47J 37/0786* (2013.01); *A47J 2037/0795* (2013.01)

(58) Field of Classification Search
CPC ...................... A47J 2037/0795; A47J 37/0786
See application file for complete search history.

(56) References Cited

U.S. PATENT DOCUMENTS

| | | | | |
|---|---|---|---|---|
| 4,437,450 A * | 3/1984 | Connelly | ................ | F24B 1/182 126/30 |
| 4,643,162 A * | 2/1987 | Collins | ............... | A47J 37/0704 126/41 R |
| 4,658,710 A * | 4/1987 | Quet | .................. | A47J 37/0704 99/450 |
| 2012/0288596 A1 * | 11/2012 | Holdo Baggott | ......... | A23L 5/15 426/235 |
| 2015/0245740 A1 * | 9/2015 | Garcia | ................ | A47J 37/0704 126/10 |
| 2017/0303741 A1 * | 10/2017 | Horne, III | ........... | A47J 37/0704 |
| 2020/0297161 A1 * | 9/2020 | Ebbes | ................. | A47J 37/0713 |

FOREIGN PATENT DOCUMENTS

DE 102016113305 A1 * 1/2018 ............ A47J 37/079

* cited by examiner

*Primary Examiner* — Jorge A Pereiro
*Assistant Examiner* — Logan P Jones
(74) *Attorney, Agent, or Firm* — Osha Bergman Watanabe & Burton LLP (57) ABSTRACT

A multifunction assemblable barbecue grill, comprising a structural frame with supporting legs, a main cooking grate, a floor and side walls to accommodate a heat source, a hinged lid, a ventilated brazier, and a shaft associated with a member to regulate the main grate with respect to the heat source. At least one S-shaped primary cooking hook is provided. The floor comprises channels flowing into a drain that discharges water into a trough displaceably mounted on two guides. A column integrated to one side of said frame, and secondary elements selected from a griddle, a secondary cooking grate, a substantially rectangular frame with a longitudinal crossbar, a crossbar perpendicular to the column, and combinations thereof, are additionally associated with at least one secondary S-shaped cooking hook. The secondary elements comprise means for fastening to the column, where said elements are slidably mounted vertically in a suspended condition above said brazier.

18 Claims, 6 Drawing Sheets

MULTIFUNCTION ASSEMBLABLE BARBECUE GRILL

TECHNICAL FIELD

The field of application of the present invention generally relates to the manufacture of barbecue grills or barbecues.

The object of the present invention relates to a multifunction assemblable charcoal and/or firewood barbecue grill, made of stainless steel or iron material with refractory elements, the grill having structural features that make it different from any grill already known in the art.

State of the Art and Problems Detected

Different types of charcoal and/or firewood barbecue grills are commercially available, including portable barbecue grills that can be transported to make different and special meals anywhere, fixed barbecue grills, and brick or built-in barbecues that are more useful especially when preparing a lot of food.

Seeing that these types of objects have been used since ancient times, they can be grouped according to the heat source used, charcoal grill barbecues being the most frequently used and the ones affording the best tasting meals according to most consumers. This requires placing a few pieces of charcoal or wood until embers are formed, before starting to cook the food.

Generally, barbecues are based on a structure with supporting legs on the ground, a bin for embers, a removable ash pan, and a food roaster grill.

Barbecue grills or barbecues are physical entities used in campsites or cottages or the like, in order to grill all kinds of food such as meat, fish, vegetables, etc.

Among the published documents disclosing barbecue grills or barbecues, the following are worth mentioning:

Publication AR02309A4 refers to a removable multifunction barbecue grill comprising a tubular structure and a surrounding sheet metal enclosure, receiving two symmetrically arranged grills that can be interchanged with four rotisserie rods attached to a worm gear fragmented according to the racks of each rotisserie skewer, the barbecue grill having a double pulley system driven from another lower shaft that moves a charcoal pan to the desired fire height. It is further possible to exchange a grill for two rotisserie rods using two racks of said worm gear for the combined option of grill and double rotisserie. The above-mentioned grill in any of its variants can be used either as a portable version with wheels or supported on a tabletop.

Patent Application published as U.S. 2015164278A1 relates to a multifunction barbecue including an ash pit, a hearth and a cooking surface, the oven including a bottom fitted with refractory stones, and a front face with a closing door. The chamber of the oven has a double wall open at the bottom and connected to a chimney mounted on the upper part of the oven and in communication with the barbecue hearth.

Patent Application published as CH692569A5 relates to multifunction modular cooking equipment having a combustion chamber and one or more separate chambers for grilling, baking, and roasting, which can be assembled together. One chamber is placed directly in or on the cooking zone at the combustion chamber and gives a further indirect heating zone using a recirculation principle. The position of the passage opening for movement of hot air between the combustion chamber and entry into the cooking chamber can be set to control temperature, volume and flow of the hot air. The equipment components are easily kept together for transport and storage.

Patent Application published as FR 2815532 A1 discloses a barbecue comprising a brazier with a meshed bottom for fuel and a column support. Under the bottom is an extractable case intended to contain firelighters and is usually housed in the column support.

None of the previously-disclosed grills or barbecues adds a complementary column to house or accommodate secondary objects or accessories, such as secondary cooking grates, griddles, cooking hooks and frames for hanging the same, and a height-adjusting system to regulate grilling temperature, taking advantage of a single brazier and obtaining simultaneous cooking, grill marking the meat, keeping the so-grilled portions warm and/or finishing the grilling of meat portions. This effect implies that these accessories need to be carried separately.

Solution Provided

A solution is provided with a multifunction assemblable barbecue grill achieving excellent cooking quality, the advantages of which are the following:

Water drainage is achieved avoiding water accumulation under the refractory elements on the floor of the grill structure supporting the same, thereby facilitating ignition and minimizing fuel consumption to evaporate all the water accumulated in such space, which may be between 2 and 3 cm high due to rainfall, watering or grill washing. The grill base is further protected from possible deterioration due to such water accumulation.

Much firewood/charcoal is saved because the calories produced in the brazier are directly used, which would otherwise be wasted. Without this, it would not be possible to take advantage of the heat produced by the fire and embers directly from the brazier, which is a most innovative feature.

Cooking temperature can be regulated in a practical and accurate manner.

Meat grill marking can be carried out easily and quickly.

Complete cooking can also be carried out on suspended griddles or grids, thereby accelerating the cooking or grilling process. Therefore, time is saved, and it is not necessary to wait for the embers to be ready. This is ideal when selected pieces of the food product need to be grilled in advance of the rest.

Vertical hooks can also be added to the suspended grill, thus allowing for cooking and/or grilling with the hook over the brazier. As another alternative, a frame with a longitudinal crossbar, or a crossbar perpendicular to the support column can be used, as a secondary cooking hook support over the brazier. The edge of a secondary cooking grate and griddle can serve the same purpose.

BRIEF DESCRIPTION OF THE DRAWINGS

To assist in the description of the invention herein below, and for the better understanding of the features of the invention, a set of figures is herein enclosed as an integral part of said description, wherein the following figures have been represented for illustrative and non-limiting purposes.

In all the figures a schematic view of the object of the invention is illustrated, which reflects constituent elements, namely:

1. Structural frame.
2. Supporting legs.
3. Caster wheels.
4. Main cooking grate.
5. Floor and walls of refractory surface (refractory elements or bricks).
6. Base.
7. Lid.
8. Handle.
9. Inner shelf.
10. Auxiliary side shelf or table, which can be foldable.
11. Brazier container.
12. Column.
13. Fastening means.
14. Griddle.
15. Secondary cooking grate.
16. Main S-shaped cooking hooks.
17. Draining system (channels, drain, and trough pan).
18. Height-adjusting system for regulating grill temperature.
19. Height-adjusting system guide bridge.
20. Secondary S-shaped cooking hooks.
21. Substantially rectangular frame with at least one longitudinal crossbar.
22. Crossbar perpendicular to the column.
23. Handgrip for handling secondary cooking elements.
24. Channel marked on the floor of the grill supporting refractory elements.
25. Central discharge drain.
26. Pan consisting of a trough slidably mounted on two guides.
27. Grilling basket.
28. Mechanical means for grilling basket inclination.
29. Various accessories.

The object of the present invention is therefore a multifunction assemblable barbecue grill which can operate with charcoal and/or firewood as fuel, said grill having a body made of stainless steel or iron material with refractory elements.

A multifunction charcoal and/or firewood assemblable barbecue grill, consisting of a plurality of stainless steel or iron parts and refractory elements, said grill comprising a structural frame (1) essentially rectangular in shape with supporting legs (2), and including a main removable cooking grate (4) wherein the products to be grilled are arranged. Under the grate, the grill comprises a floor and side walls (5) lined with refractory elements constituting a refractory surface to accommodate a heat source, preferably embers resulting from charcoal and/or firewood.

In particular, the supporting legs (2) additionally comprise caster wheels (3), preferably caster roller wheels, allowing the barbecue grill of the invention to be maneuvered in confined spaces, such as a balcony or small yard where it is installed.

Said floor and side walls lined with refractory elements, preferably regular substantially prismatic bricks, minimize heat transmission to the outer wall and extend the durability of the metal grill structure, while protecting the user. Likewise, the heat accumulated by said refractory elements minimizes fuel consumption and harmonizes distribution of the heat resulting from the combustion thereof, essentially charcoal and/or firewood.

Figure 1:
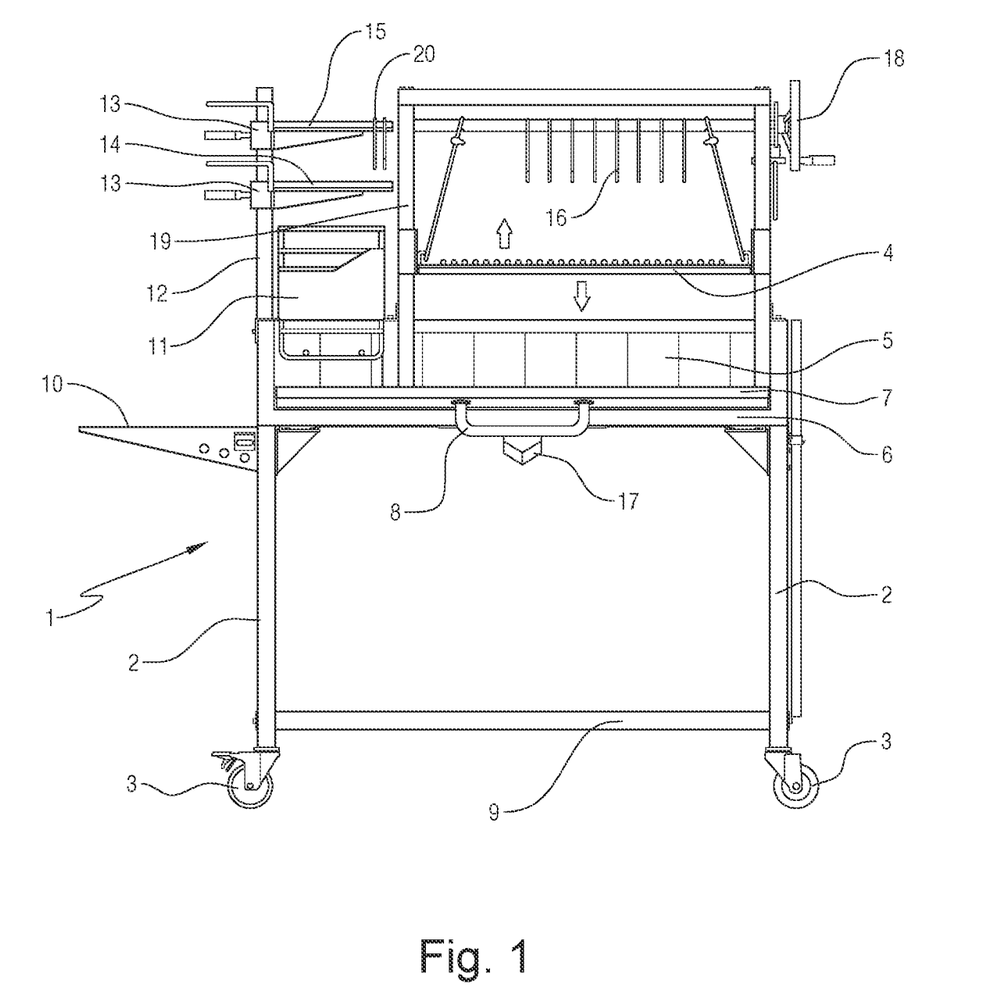
FIG. 1 is an illustrative front view of a preferred embodiment of the multifunction assemblable barbecue grill of the present invention.
Figure 2:
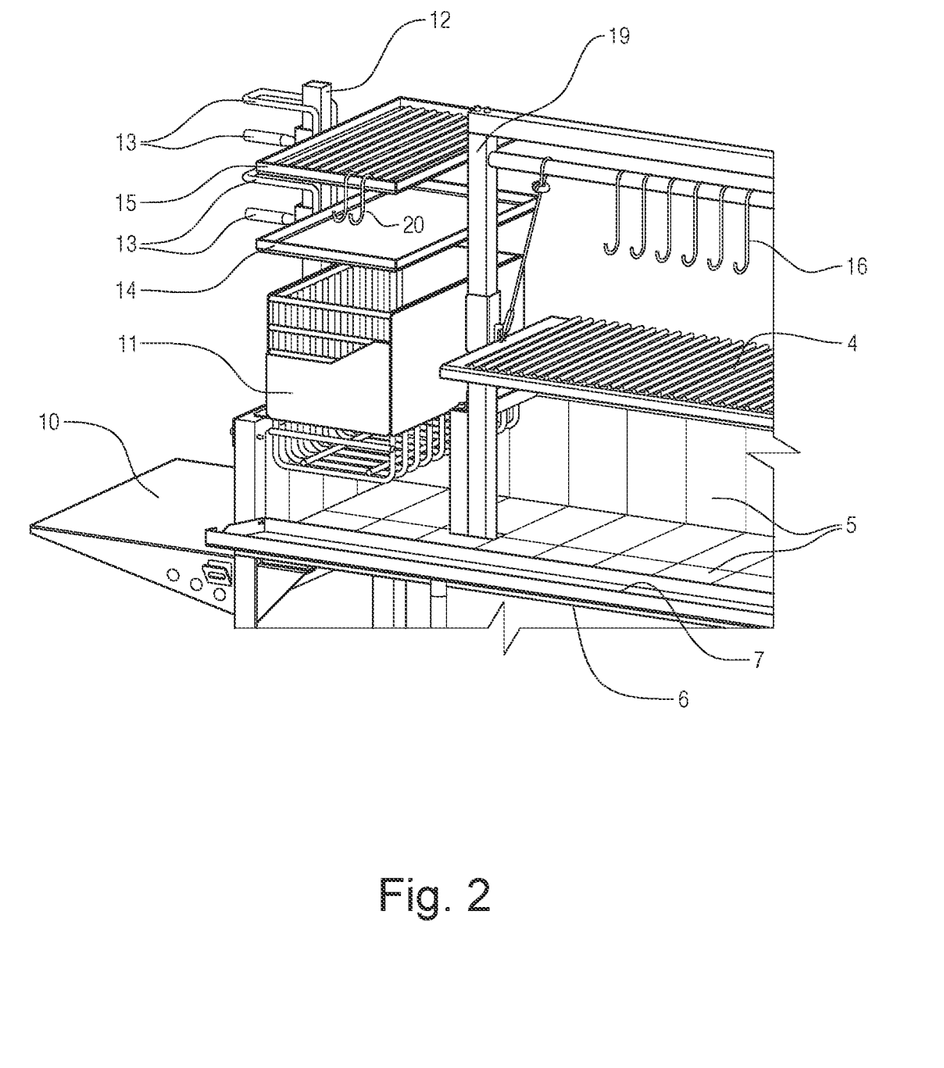
FIG. 2 is an illustrative perspective view of a detail of the grill brazier area and the secondary cooking hooks.
Figure 3:
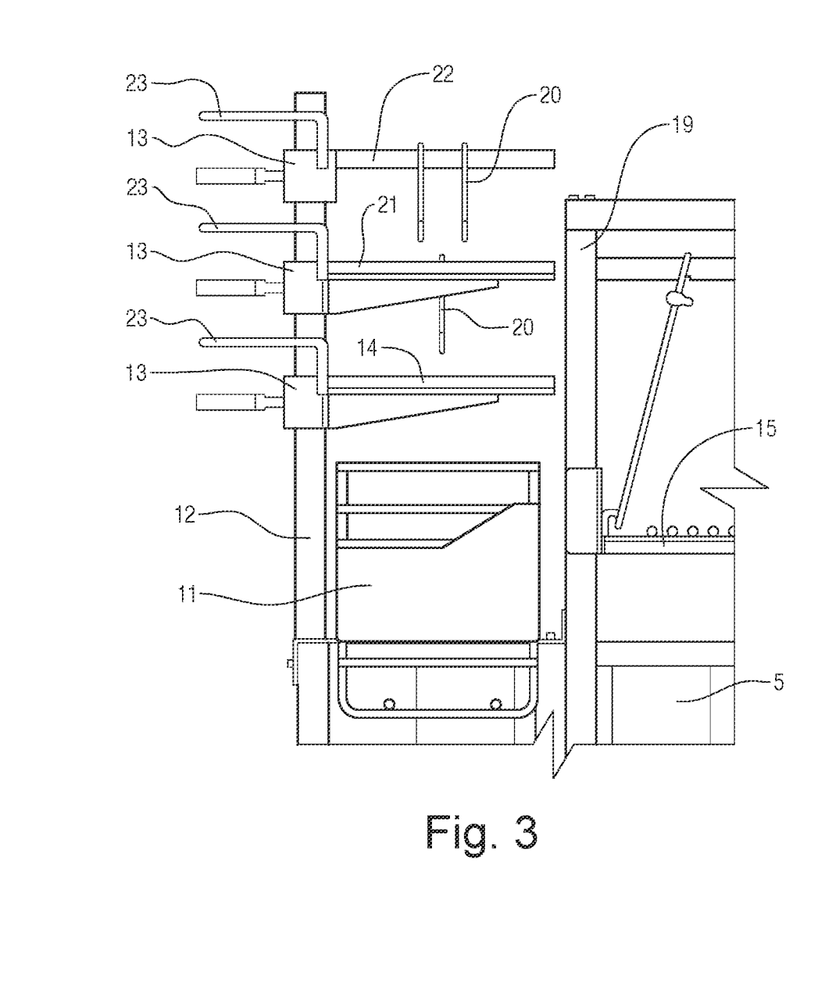
FIG. 3 is an illustrative front view of a detail of the grill brazier area shown in FIG. 2.
Figure 4:
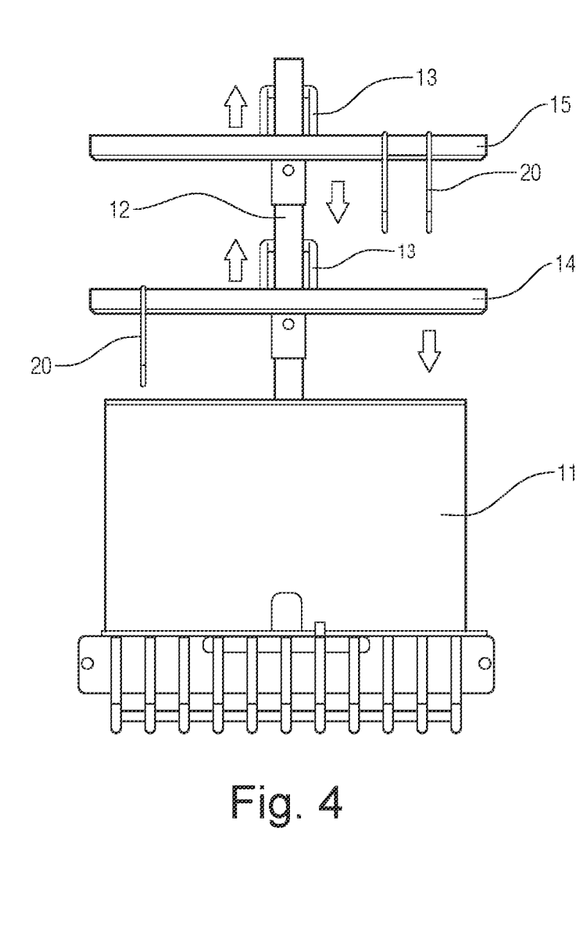
FIG. 4 is an illustrative side view of a detail of the grill brazier area shown in FIG. 2.
Figure 5:
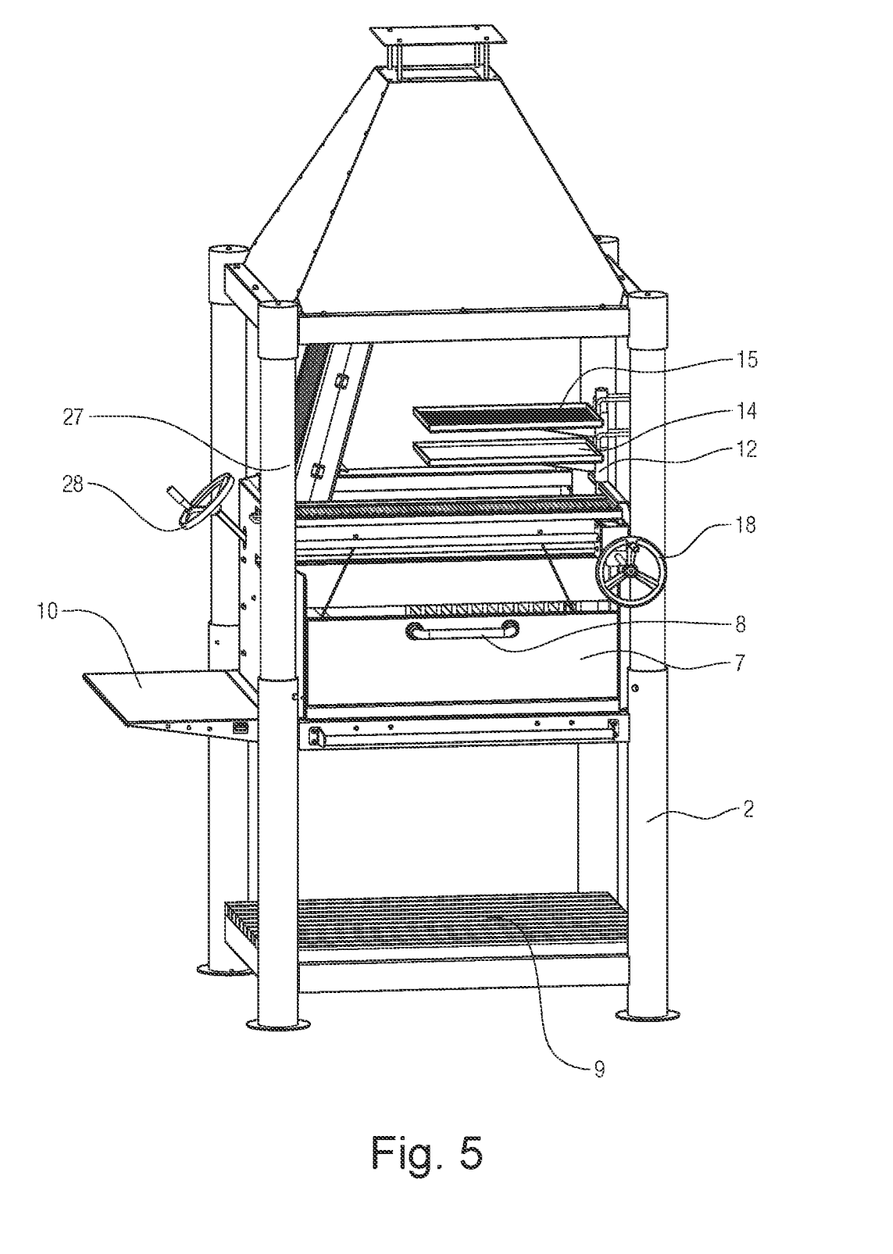
FIG. 5 shows an illustrative perspective view of another preferred embodiment of the multifunction assemblable barbecue grill according to the present invention.
Figure 6:
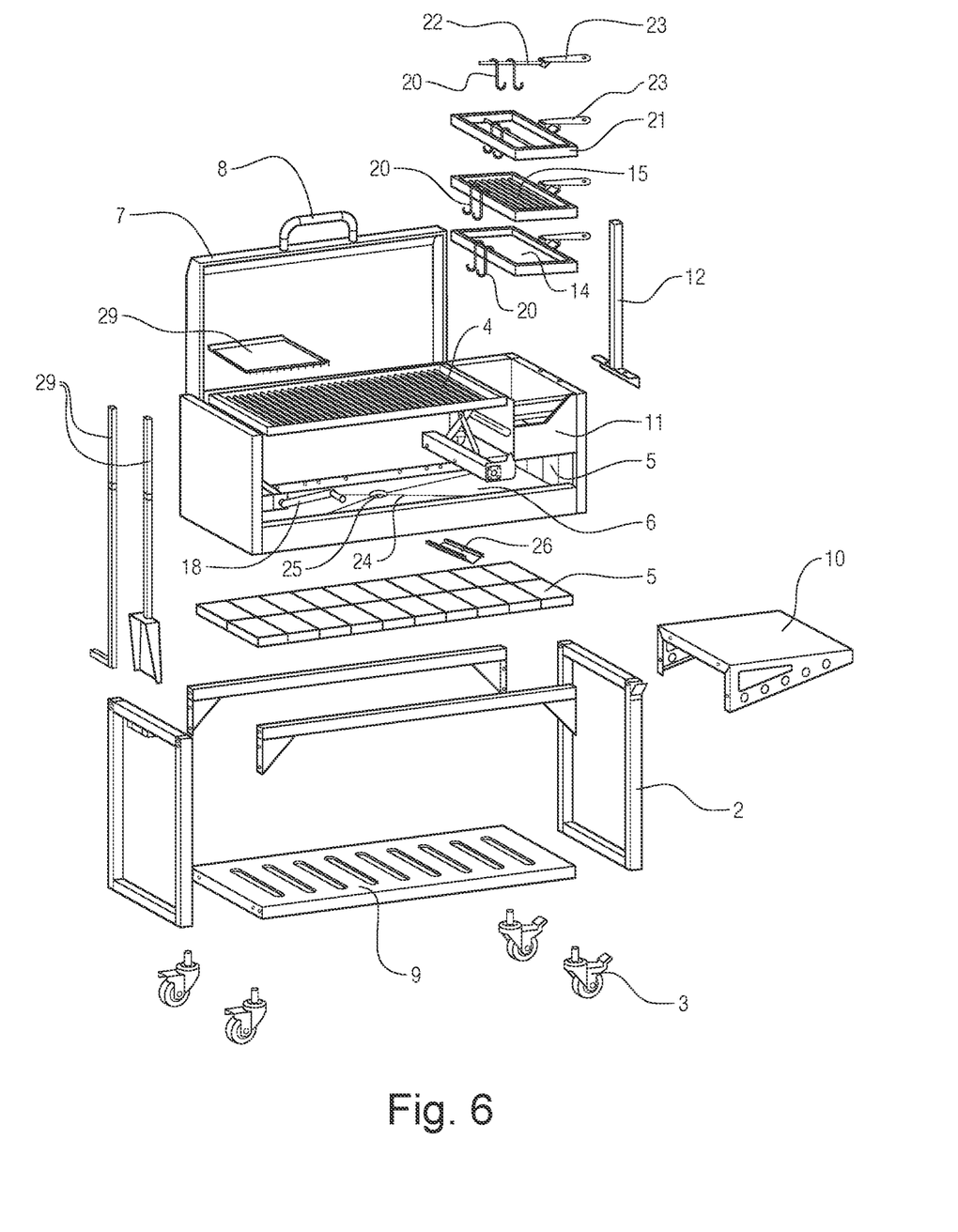
FIG. 6 shows an exploded perspective view of still another preferred embodiment of the barbecue grill according to the present invention.
Figure 7:
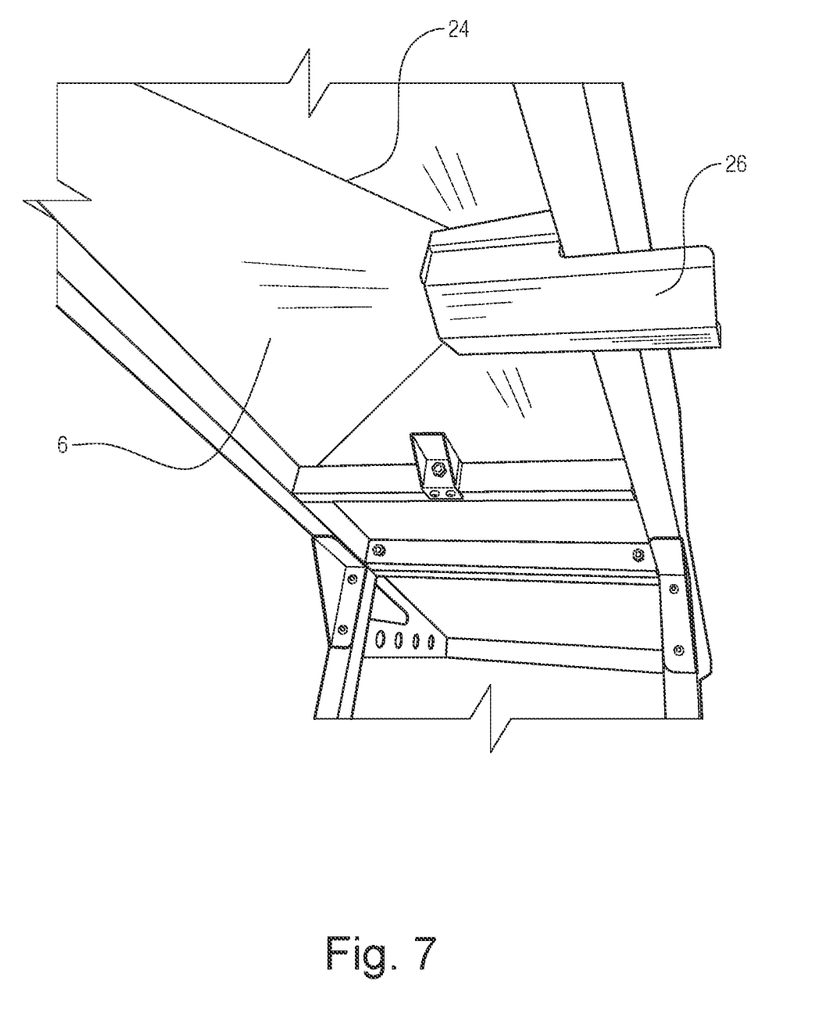
FIG. 7 is a bottom perspective view of the grill rear portion of the present invention showing the trough mounted on the guides beneath the grill floor, in a position that facilitates water drainage.

The floor of the barbecue grill of the invention on which the refractory elements are located comprises channels (24) creating a difference in height, thereby flowing into a central drain (25) that discharges into a tray consisting of a trough (26) mounted on two guides in a displaceable manner to prevent water accumulation. Preferably, the trough (26) is displaced on the guides beneath the grill floor and backwards such that water drainage is produced at the rear portion of the grill.

In addition, the barbecue grill of the present invention comprises at the front part thereof a hinged lid (7) with a handle (8), and further includes a ventilated brazier (11). It further comprises a rotatably mounted shaft (18) associated with an outer control member for regulating the height of the main cooking grate (4) with respect to the heat source supported by a guide bridge (19), wherein at least one main S-shaped cooking hook (16) is accessorily provided.

Specifically, the ventilated brazier (11) is a container with or without side walls. Said brazier (11) is of gaucho style (firebox) wherein the charcoal or wood is ignited faster thanks to the air circulation allowing for combustion to be activated.

Particularly, the hinged lid (7) with a handle (8) at the front part of the grill can alternatively fold behind or in front of the grill.

The barbecue grill of the invention accessorily comprises at least one inner shelf (9), a foldable auxiliary side shelf (10), or a combination thereof. In particular, the foldable side shelf or table provides additional space for cooking, and being foldable in nature, it is operative as required by the user.

The barbecue grill of the present invention includes a rotatably mounted shaft (18) associated with an outer control member for regulating the height of the main cooking grate (4) with respect to the heat source supported by a guide bridge (19), wherein at least one main S-shaped cooking hook (16) is accessorily provided.

Distinctively, the barbecue grill of the present invention comprises a column (12) integrally associated to one side of said structural frame (1) and at least one secondary element selected from a griddle (14), a secondary cooking grate (15), a substantially rectangular frame with at least one longitudinal crossbar (21), a crossbar perpendicular to the column (22), and combinations thereof, in association with at least one secondary S-shaped cooking hook (20); wherein the griddle (14), the secondary cooking grate (15), the frame with at least one longitudinal crossbar (21) and the crossbar perpendicular to the column (22) optionally and alternatively serve as a support for the at least one secondary S-shaped cooking hook (20); and wherein the griddle (14), the secondary cooking grate (15), the frame with at least one longitudinal crossbar (21) and the crossbar perpendicular to the column (22) comprise means for fastening (13) to said column (12), such that said secondary elements are slidably mounted in tandem vertically in suspended condition and above said brazier (11).

Accordingly, said elements are slidably mounted either individually or combined in tandem vertically, in a suspended condition and above said brazier (11), according to the user's own requirements. The secondary elements may additionally comprise a handgrip (23) for handling.

Distinctively, the column (12) integrally associated to the side of the structural frame (1) is of square or circular shape. When the column is circular in shape, the fastening means allow for rotation of each of the elements selected from a griddle (14), a secondary cooking grate (15), a substantially rectangular frame with at least one longitudinal crossbar (21), and a crossbar perpendicular to the column (22) in a plane maintaining the height thereof with respect to the brazier (11).

In a preferred embodiment, the multifunction barbecue grill comprises a griddle (14) fixed to the column (12) by means of respective fastening means (13).

In another preferred embodiment, the multifunction barbecue grill comprises a griddle (14) supporting secondary vertical S-shaped cooking hooks on the edge, said griddle being fixed to the column (12) by respective fastening means.

In yet another preferred embodiment, the multifunction barbecue grill comprises a secondary cooking grate (15) fixed to the column (12) by means of respective fastening means (13).

In yet another preferred embodiment, the multifunction barbecue grill comprises a secondary cooking grate (15) supporting secondary vertical S-shaped cooking hooks, said grate being fixed to the column (12) by respective fastening means.

In yet another preferred embodiment, the multifunction barbecue grill comprises a substantially rectangular frame with at least one longitudinal crossbar (21), said frame being fixed to the column (12) by respective fastening means (13).

In yet another preferred embodiment, the multifunction barbecue grill comprises a crossbar perpendicular to the column (22) and vertical S-shaped hooks (20), said crossbar being fixed to the column (12) by respective fastening means (13).

In an alternative embodiment, the multifunction assemblable barbecue grill of the invention comprises a griddle (14) and a secondary cooking grate (15), said griddle and said grate being fixed in tandem to the column (12), one below the other, by respective fastening means (13).

In another alternative embodiment, the multifunction assemblable barbecue grill of the invention comprises a griddle (14) and a secondary cooking grate (15) supporting secondary vertical S-shaped cooking hooks, said griddle and said grate being fixed in tandem to the column (12), one below the other, by respective fastening means (13).

In yet another alternative embodiment, the multifunction assemblable barbecue grill of the present invention comprises a griddle (14) and a frame with at least one longitudinal crossbar (21) supporting at least one secondary vertical S-shaped cooking hook (20), said griddle and said frame being fixed in tandem to the column (12), one below the other, by respective fastening means (13).

In yet another alternative embodiment, the multifunction assemblable barbecue grill of the present invention comprises a griddle (14) and crossbar perpendicular to the column (22) supporting at least one secondary vertical S-shaped cooking hook, said griddle and said crossbar being fixed in tandem to the column (12), one below the other, by respective fastening means (13).

In yet another alternative embodiment, the multifunction assemblable barbecue grill of the present invention comprises a secondary cooking grate (15) and a frame with at least one longitudinal crossbar (21) supporting at least one secondary vertical S-shaped cooking hook (20), said grate and said frame being fixed in tandem to the column (12), one below the other, by respective fastening means (13).

In yet another alternative embodiment, the multifunction assemblable barbecue grill of the present invention comprises a secondary cooking grate (15) and crossbar perpendicular to the column (22) supporting at least one secondary vertical S-shaped cooking hook, said grate and said crossbar being fixed in tandem to the column (12), one below the other, by respective fastening means (13).

In yet another alternative embodiment, the multifunction assemblable barbecue grill of the present invention comprises a frame with at least one longitudinal crossbar (21) supporting at least one secondary vertical S-shaped cooking hook, and a crossbar perpendicular to the column (22) supporting at least one secondary vertical S-shaped cooking hook, said frame and said crossbar being fixed in tandem to the column (12), one below the other, by respective fastening means (13).

In yet another alternative embodiment, the multifunction assemblable barbecue grill of the present invention comprises a griddle (14), a secondary cooking grate (15) and a frame with at least one longitudinally disposed crossbar (21) supporting at least one secondary vertical S-shaped cooking hook, said griddle, said grate, and said frame being fixed in tandem to the column (12), one below the other, by respective fastening means (13).

In yet another alternative embodiment, the multifunction assemblable barbecue grill of the present invention comprises a griddle (14), a secondary cooking grate (15) and a crossbar perpendicular to the column (22) supporting at least one secondary vertical S-shaped cooking hook, said griddle, said grate, and said crossbar being fixed in tandem to the column (12), one below the other, by respective fastening means (13).

Finally, in another alternative embodiment, the multifunction assemblable barbecue grill of the present invention comprises a secondary cooking grate (15), a frame with at least one longitudinal crossbar (21) supporting at least one secondary vertical S-shaped cooking hook (20), and a crossbar perpendicular to the column (22) supporting at least one secondary vertical S-shaped cooking hook (20), said grate, said frame, and said crossbar being fixed in tandem to the column (12), one below the other, by respective fastening means (13).

In particular, the fastening means (13) are constituted by a clamp with a set screw for adjustment on the column (12), which allows the secondary cooking elements to be positioned at a desired height over the brazier (11) by the user.

Depending on the food products to be cooked and/or grilled, they can be distributed between the main and secondary grates (4, 15) as well as between the primary and secondary (16, 20) hooks at the user's choice.

Depending on the products to be cooked and/or grilled, the griddle can be located below the grate or vice versa at the user's choice. Depending on the food products to be cooked and/or grilled, they can also be distributed among the griddle, the primary and secondary grates and the primary and secondary hooks at different heights at the user's choice.

Accessorily, the barbecue grill of the present invention can comprise a grilling basket (27) or a grilling cross, which is adjustable in inclination with respect to the heat source by suitable external mechanical means (28).

The barbecue grill of the invention can be made of stainless steel or iron, except obviously for the refractory elements, and can have round iron on the grates for easy cleaning. The entire structure can be assembled and disassembled, and can be assembled by fastening the parts using suitable fastening means, such as nuts, screws, and the like.

The barbecue grill of the invention can have various accessories (29) normally used to handle charcoal, firewood and embers, such as a long-handle shovel, an L-hook for dragging and distributing embers, heating surfaces to keep grilled food warm without burning it, etc. All these elements are well-known in the art and do not belong to the invention.

Therefore, the barbecue grill according to the present invention provides multiple options for roasting, cooking and/or grilling different types of food through the different options described above.

The invention claimed is:

1. A multifunction charcoal and/or firewood assemblable barbecue grill, consisting of a plurality of stainless steel or iron parts and refractory elements, said grill comprising a structural frame (1) essentially rectangular in shape with supporting legs (2), and a main removable cooking grate (4) wherein the products to be grilled are arranged and under which, said grill further comprising under the grate a floor and side walls (5) lined with refractory elements constituting a refractory surface to accommodate a heat source, and comprising at the front part thereof a hinged lid (7) with a handle (8), further comprising a ventilated brazier (11), further comprising a rotatably mounted shaft (18) associated with an outer control member for regulating the height of the main cooking grate (4) with respect to the heat source supported by a guide bridge (19), wherein at least one main S-shaped cooking hook (16) is accessorily provided;

said grill characterized by comprising:
a draining system (17) on the floor on which the refractory elements are located, said system comprising channels (24) flowing into a central drain (25) that discharges into a pan (26) consisting of a trough mounted on two guides in a displaceable manner to prevent water accumulation;
a column (12) integrally associated with one side of said structural frame (1); and
at least one secondary element selected from a griddle (14), a secondary cooking grate (15), a substantially rectangular frame with at least one longitudinal crossbar (21), a crossbar perpendicular to the column (22) and combinations thereof, associated with at least one secondary S-shaped cooking hook (20);
wherein the griddle (14), the secondary cooking grate (15), the frame with at least one longitudinal crossbar (21) and the crossbar perpendicular to the column (22) optionally and alternatively serve as a support for the at least one secondary S-shaped cooking hook (20); and
wherein the griddle (14), the secondary cooking grate (15), the frame with at least one longitudinal crossbar (21) and the crossbar perpendicular to the column (22) comprise means for fastening (13) to said column (12), such that said secondary elements are slidably mounted vertically in suspended condition and above said brazier (11).

2. The multifunction assemblable barbecue grill of claim 1, wherein the supporting legs (2) further comprise caster wheels (3).

3. The multifunction assemblable barbecue grill of claim 1, wherein the ventilated brazier (11) is a container with or without side walls.

4. The multifunction assemblable barbecue grill of claim 1, accessorily comprising at least one inner shelf (9), a foldable auxiliary side shelf (10), or a combination thereof.

5. The multifunction assemblable barbecue grill of claim 1, wherein the column (12) integrally associated to the side of the structural frame (1) is of square or circular shape.

6. The multifunction assemblable barbecue grill of claim 5, wherein when the column is circular in shape, the fastening means allow for rotation of each of the elements selected from a griddle (14), a secondary cooking grate (15), a substantially rectangular frame with at least one longitudinal crossbar (21), and a crossbar perpendicular to the column (22) in a plane maintaining the height thereof.

7. The multifunction assemblable barbecue grill of claim 1, comprising a griddle (14) and a secondary cooking grate (15), said griddle and said grate being fixed in tandem to the column (12), one below the other, by respective fastening means (13).

8. The multifunction assemblable barbecue grill of claim 1, comprising a griddle (14) and a secondary cooking grate (15) supporting secondary vertical S-shaped cooking hooks, said griddle and said grate being fixed in tandem to the column (12), one below the other, by respective fastening means (13).

9. The multifunction assemblable barbecue grill of claim 1, comprising a griddle (14) and a frame with at least one longitudinal crossbar (21) supporting at least one secondary vertical S-shaped cooking hook, said griddle and said frame being fixed in tandem to the column (12), one below the other, by respective fastening means (13).

10. The multifunction assemblable barbecue grill of claim 1, comprising a griddle (14) and a crossbar perpendicular to the column (22) supporting at least one secondary vertical S-shaped cooking hook, said griddle and said crossbar being fixed in tandem to the column (12), one below the other, by respective fastening means (13).

11. The multifunction assemblable barbecue grill of claim 1, comprising a secondary cooking grate (15) and a frame with at least one longitudinal crossbar (21) supporting at least one secondary vertical S-shaped cooking hook, said grate and said frame being fixed in tandem to the column (12), one below the other, by respective fastening means (13).

12. The multifunction assemblable barbecue grill of claim 1, comprising a secondary cooking grate (15) and a crossbar perpendicular to the column (22) supporting at least one secondary vertical S-shaped cooking hook, said grate and said crossbar being fixed in tandem to the column (12), one below the other, by respective fastening means (13).

13. The multifunction assemblable barbecue grill of claim 1, comprising a frame with at least one longitudinal crossbar (21) supporting at least one secondary vertical S-shaped cooking hook, and a crossbar perpendicular to the column (22) supporting at least one secondary vertical S-shaped cooking hook, said frame and said crossbar being fixed in tandem to the column (12), one below the other, by respective fastening means (13).

14. The multifunction assemblable barbecue grill of claim 1, comprising a griddle (14), a secondary cooking grate (15) and a frame with at least one longitudinally disposed crossbar (21) supporting at least one secondary vertical S-shaped cooking hook, said griddle, said grate and said frame being fixed in tandem to the column (12), one below the other, by respective fastening means (13).

15. The multifunction assemblable barbecue grill of claim 1, comprising a griddle (14), a secondary cooking grate (15) and a crossbar perpendicular to the column (22) supporting at least one secondary vertical S-shaped cooking hook, 4 said griddle, said grate and said crossbar being fixed in tandem to the column (12), one below the other, by respective fastening means (13).

16. The multifunction assemblable barbecue grill of claim 1, comprising a secondary cooking grate (15), a frame with at least one longitudinal crossbar (21) supporting at least one secondary vertical S-shaped cooking hook, and a crossbar perpendicular to the column (22) supporting at least one secondary vertical S-shaped cooking hook, said grate, said frame, and said crossbar being fixed in tandem to the column (12), one below the other, by respective fastening means (13).

17. The multifunction assemblable barbecue grill of claim 1, wherein the fastening means consists of a clamp with a set screw.

18. The multifunction assemblable barbecue grill of claim 1, wherein the secondary elements can accessorily comprise a handgrip (23) for handling.

\* \* \* \* \*